(12) United States Patent
Fitzpatrick et al.

(10) Patent No.: US 7,225,226 B2
(45) Date of Patent: May 29, 2007

(54) CHAT MESSAGING CHANNEL REDIRECTION

(75) Inventors: Gregory P. Fitzpatrick, Keller, TX (US); Thomas R. Haynes, Apex, NC (US); James J. Toohey, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/256,528

(22) Filed: Sep. 27, 2002

(65) Prior Publication Data

US 2004/0061718 A1    Apr. 1, 2004

(51) Int. Cl.
*G06F 15/16* (2006.01)
(52) U.S. Cl. ..................... 709/205; 709/228
(58) Field of Classification Search ................. 709/206, 709/228
See application file for complete search history.

(56) References Cited

U.S. PATENT DOCUMENTS

| | | | | |
|---|---|---|---|---|
| 5,951,694 | A * | 9/1999 | Choquier et al. | 714/15 |
| 6,076,100 | A | 6/2000 | Cottrille et al. | 709/203 |
| 6,501,834 | B1 * | 12/2002 | Milewski et al. | 379/93.24 |
| 6,636,587 | B1 * | 10/2003 | Nagai et al. | 379/88.14 |
| 6,983,370 | B2 * | 1/2006 | Eaton et al. | 713/182 |
| 2002/0152402 | A1 * | 10/2002 | Tov et al. | 713/201 |
| 2003/0023691 | A1 * | 1/2003 | Knauerhase | 709/206 |
| 2003/0072420 | A1 * | 4/2003 | Feigenbaum | 379/52 |

FOREIGN PATENT DOCUMENTS

| | | |
|---|---|---|
| JP | 2001-109689 A | 4/2001 |
| WO | WO 01/06361 A2 | 1/2001 |
| WO | WO 01/06364 A2 | 1/2001 |
| WO | WO 01/06365 A2 | 1/2001 |

OTHER PUBLICATIONS

C.M. Tam, Use of the Internet to Enhance Construction Communication: Total Information Transfer System, *Int'l Journal of Project Management*, vol. 17, No. 2, pp. 107-111, (1999).

* cited by examiner

*Primary Examiner*—Jason Cardone
*Assistant Examiner*—Minh-Chau Nguyen
(74) *Attorney, Agent, or Firm*—Akerman Senterfitt

(57) ABSTRACT

A method of chat messaging can include, establishing communication links with at least a first and a second participant for exchanging chat messages through a chat engine. A state change can be detected for the first participant. An alternate communication channel and an alternate communication channel address can be determined from a user profile of the first participant. While maintaining the communication link with the second participant, a different communication link can be established using the alternative communication channel and the alternative communication channel address. The first participant and the second participant can be communicatively linked subsequent to establishing the connection through the chat engine.

32 Claims, 3 Drawing Sheets

CHAT MESSAGING CHANNEL REDIRECTION

BACKGROUND OF THE INVENTION

1. Field of the Invention

The present invention relates to the field of chat messaging.

2. Description of the Related Art

Users of chat systems, or so called instant messaging systems, often face the problem of communicating with a chat participant who suddenly discontinues participation in an ongoing or established chat session. The discontinuation of the chat session may be either an intentional termination or an unintentional termination, for example in the case of a network disruption or other failure. Alternatively, a chat participant may choose to discontinue participation in a chat session simply by changing his or her online status to one that indicates "away", "on the phone", "busy", or some other condition rendering the chat participant unavailable to incoming messages. If a chat participant is in the midst of composing a message to another chat participant who disconnects from the chat session, the message cannot be delivered immediately to the disconnecting participant as a chat message. Instead, most conventional chat systems store undelivered messages for delivery to the disconnecting chat participant until such time when the chat participant logs back on to the chat system. In consequence, the participant composing the message has no means of delivering the message to the disconnecting chat participant and no means of knowing an approximate time when the disconnecting chat participant will eventually receive the message.

Even more problematic is the situation in which a chat participant has no contact information other than a chat system username for the disconnecting party. This situation can arise in a variety of circumstances. For example, if a chat participant is traveling and accesses a chat session from a remote location, other chat participants may not have contact information other than a home or work number, neither of which would be useful in contacting the traveling chat participant. In that case, unless the disconnecting party chooses to notify other chat participants, for instance, within a chat message, the other chat participants would have no means of contacting the disconnecting chat participant outside of the chat system environment. As a result, a chat participant sending a message cannot be assured of timely receipt of the message by the disconnecting chat participant. Rather, the sending chat participant knows only that when the disconnecting chat participant eventually logs back on to the chat system, the chat message will be delivered. For time critical messages, delivery at an unspecified future time and/or date is not sufficient.

SUMMARY OF THE INVENTION

The invention disclosed herein provides a method and system for chat communication which enable chat participants to continue participating in an ongoing chat session over alternate communication channels. Accordingly, using one or more alternate communication channels, chat messages can be redirected to and from a chat participant who has disconnected from a chat session. For example, chat messages can be converted to audio messages and routed to a chat participant over an audio channel to an audio-enabled device. Similarly, audio messages can be converted to text messages. In either case, the messages can be provided to any of a variety of communication devices via a suitable communication link without interrupting the chat session from the perspective of non-disconnecting chat participants.

One aspect of the present invention can include a method of chat messaging. The method can include establishing communication links with at least a first and a second participant for exchanging chat communications through a chat engine. A state change can be detected for the first participant. For example, the state change can include a disconnect event or a status change event. If necessary, the communication link with the first participant can be terminated. An alternate communication channel and an alternate communication channel address can be determined from a user profile for the first participant. The second participant can be notified of the detected state change of the first participant and can be prompted whether to establish a connection with the first user using the alternate communication channel and the alternate communication channel address.

While maintaining the communication link with the second participant, a different communication link with the first participant can be established using the alternate communication channel and the alternate communication channel address. Once the communication link is established, the first participant and the second participant can be communicatively linked. Notably, the chat participants can be communicatively linked through a chat engine. Additionally, the step of establishing the different communication link can occur automatically without first prompting the second participant.

The method can include redirecting a received message from the second participant to the first participant using the alternate communication channel. If necessary, the received message can be translated from a modality conforming to a communication channel used by the second participant to a modality conforming to the alternate communication channel of the first participant. Additionally, the message can be formatted using a communications protocol associated with the alternate communication channel. The message can be sent to the alternate communication channel address for the first participant over the alternate communication channel.

One or more messages from the first participant can be received through the alternate communication channel. The message can be formatted using a communications protocol and sent to the second participant. If necessary, the message can be translated from a modality conforming to the alternate communication channel of the first participant to a modality conforming to a communication channel used by the second participant.

The method also can include establishing another different communication link with the first participant using a second alternate communication channel and a second alternate communication channel address while maintaining the communication link with the second participant. In consequence, the first participant and the second participant can be communicatively linked through the chat engine. Further, the second alternate communication channel and the second alternate communication address can be determined from the user profile of the first participant.

According to another embodiment of the present invention, the method also can include establishing an alternate communication link with the second participant using a second alternate communication channel and a second alternate communication channel address. In that case, a type of the second alternate communication channel can be the same as a type of one of the alternate communication channels used to connect with the first participant. The second participant can be queried to determine whether to switch communication channels to match the type of the alternate communication channel of the first participant.

Another aspect of the present invention can include a chat communication system having one or more user profiles specifying alternate communication channels for chat participants. The chat communication system also can include a chat engine configured to detect state changes for chat participants. Responsive to detecting the state changes, the chat engine can establish communication links with the chat participants using the specified alternate communication channels. The chat engine further can be configured to format messages using one of a plurality of communication protocols conforming to a selected communication channel. The chat communication system also can include a message modality converter configured to convert messages from a modality conforming to one communication channel to a modality conforming to a different communication channel. The message modality converter can include a speech recognition engine configured to convert user spoken utterances to text and a text-to-speech engine configured to convert text to audio representations of the text.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a method of chat communication which enables chat participants to continue participating in an ongoing chat session over alternate communication channels. As used herein, the term "alternative communication channel" can refer to the sending of a message to a receiving device that is different from a device previously used by a chat participant during an ongoing chat session; and/or the sending of a message to a same device, but using a different modality than previously used during the chat session. Accordingly, using one or more alternate communication channels, chat messages can be redirected to and from a chat participant who has disconnected from a chat session. For example, chat messages can be converted to audio messages and routed to a chat participant over an audio channel to an audio-enabled device.

From the perspective of the remaining chat participants, the continuity of the session, or the session context, can remain intact. This allows any chat participant to switch to another communication channel and still maintain session connection with all other chat session participants. That is, the remaining chat participants still can view the full history of the chat session and continue within the chat session uninterrupted as if the disconnecting chat participant were still engaged in the chat session without having re-established a communication link over an alternate communication channel.

Figure 1:
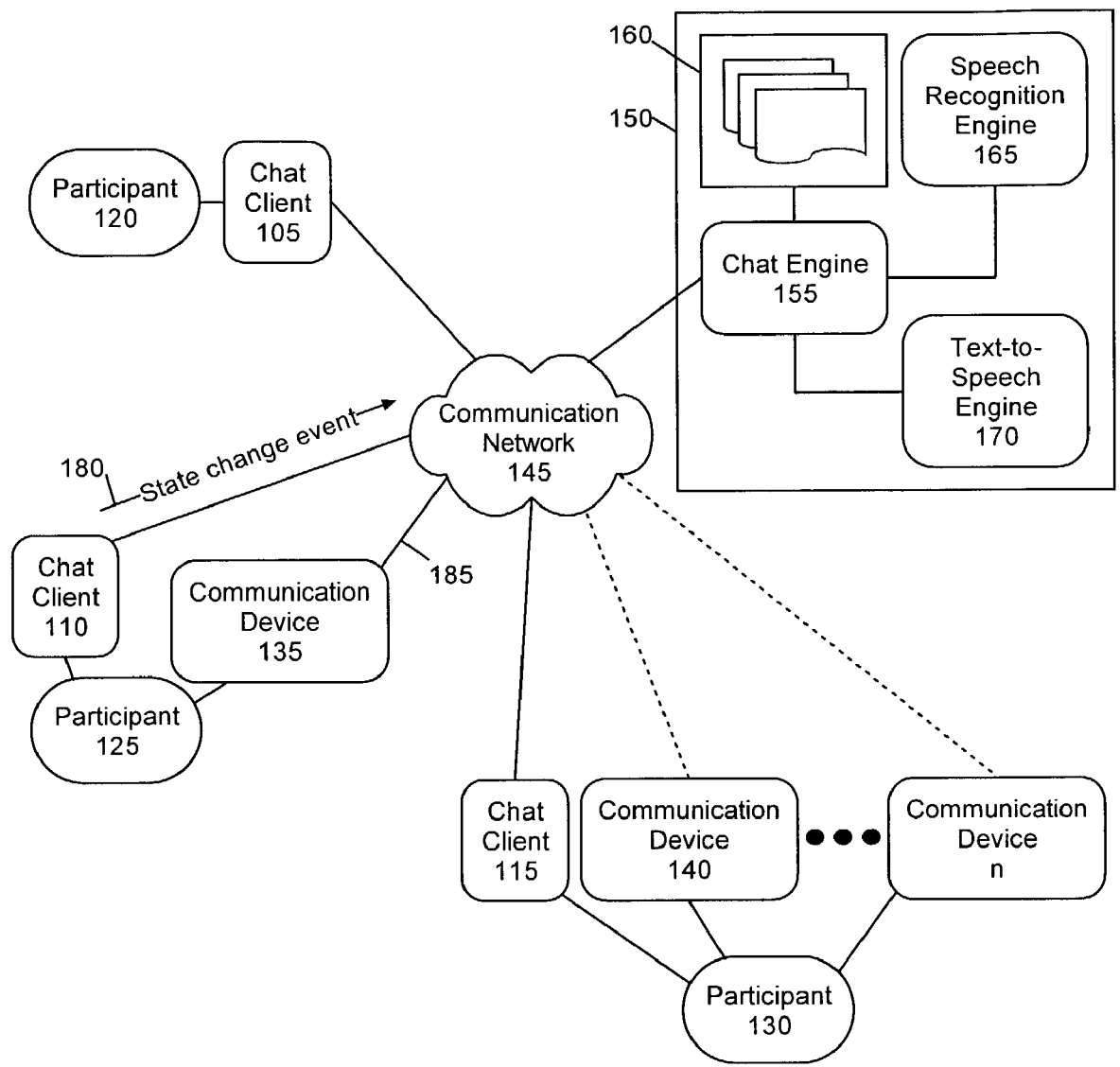
FIG. 1 is a schematic diagram illustrating an exemplary system for chat communication in accordance with the inventive arrangements disclosed herein.

FIG. 1 is a schematic diagram illustrating an exemplary system 100 for chat communications in accordance with the inventive arrangements disclosed herein. As shown, the system 100 can include a series of chat clients 105, 110, and 115, each corresponding to a chat participant 120, 125, and 130 respectively. Each chat participant also can be associated with one or more alternate communication devices. For example, the chat participant 125 can be associated with communication device 135; and chat participant 130 can be associated with communication device 140-n possible communication devices.

Each of the chat clients 105–115, the various communication devices 135 and 140-n, as well as a chat communication system 150 can be communicatively linked, at particular times, via the communications network 145. The communication network 145 can include a data communications network, a telecommunications network, a wireless network such as a cellular and/or paging network, and the like, each being communicatively linked via a suitable gateway interface.

The chat clients 105–115 can be disposed in a computing device such as a computer, a portable computer, or another communication device. The alternate communication devices can include devices such as wireless telephones, pagers, personal digital assistants, computers systems, and the like. While some of the alternate communication devices can be configured to send and receive text messages in a chat session context, other ones of the alternate communication devices can be configured to send and receive messages of a different modality, for example audio messages.

The chat communication system 150 can include a chat engine 155, a data store 160 having user profiles stored therein, a speech recognition engine 165, and a text-to-speech engine 170. The chat engine 155 can be configured to perform conventional tasks such as registering users, authenticating users, detecting registered users having an online presence, as well as receiving and routing chat messages between chat participants engaged in a chat session. Notably, responsive to particular events, the chat engine 155 can consult the data store 160 of user profiles to determine a course of action which can vary with the user profiles accessed and the received event. Although the chat engine 155 can be configured to operate in accordance with the inventive arrangements disclosed herein, according to another embodiment of the present invention, the event processing functions described herein can be implemented as a plug-in or extension which can be added to an existing chat engine.

The user profiles can specify general user data required for chat messaging such as registration, authentication, and personalization information, in addition to one or more alternate communication channels over which chat participants can be reached. Accordingly, addresses can be specified for each listed alternate communication channel. As mentioned, the alternate communication channels can refer to the redirection of messages to different devices such as computer systems, wireless telephones, pagers, personal digital assistants, or other communications devices which can send and receive either text and/or audio messages over the communications network 145. Still, an alternate communication channel can refer to the redirection of a message to a same device, but using a different modality. Thus, in the event a chat participant is communicating using text messaging with a wireless telephone, an alternative communication channel can include text-to-speech converting a message and sending the message to the wireless telephone as an audio message. Accordingly, addresses for alternative communication channels can be specified as telephone numbers, electronic mail addresses, user names, or the like. Notably, in the event that an alternate communication device can communicate using more than one modality, each modality of the communication device can be specified as a potential alternate communication channel within a user profile.

The alternate communication channels specified in the user profile can be ordered according to user preference such that a connection is attempted using one communication channel prior to another. Further, user profiles can include rules defining cases in which particular communication channels are to be used for contacting users, and by whom. For example, a user profile can specify that for a given disconnect event, the disconnecting chat participant prefers to continue a chat session via cellular telephone using audio messages. Another rule can specify that when the participant changes his or her online state to "busy", only text messages to a pager should be attempted. Thus, the rules can vary according to the type of received event, the identity of other participants involved in the chat session, and the preferences of the disconnecting participant as specified in the user profile.

Notably, chat participants can be given the ability to override selected rules of other chat participants. For example, participant 120 can author a rule specifying that the chat engine 155 is to attempt to establish a connection with the disconnecting participant 125 via an unpublished cellular telephone number in the case of a disconnect event. The unpublished cellular telephone number of participant 125 can be specified in the user profile of participant 120 or 125.

In this embodiment of the invention, the user profile of participant 125 can specify preferences in a public portion of the profile which can be overridden by other chat participants. Thus, if the public rules of participant 125 specify that no chat participants are allowed to establish connections via alternate communication channels, the rule can be overridden by the profile of participant 120. The participant 125, however, can specify absolute rules which cannot be overridden by other participants by designating those rules as private. Still, the rule hierarchy can be specified using any of a variety of techniques, for example specifying exceptions for particular classes of users such as acquaintances, family, personal, business, and the like.

According to another embodiment of the present invention, the user profiles need not be stored within a centralized data store or database. Rather, the user profiles can be hard-coded into the chat engine or can be included within a public registry which can be accessed by the chat engine 155 over the communication network 145. Still, the user profiles can be specified within a Web service which also can provide communication device-specific transforms corresponding to any alternate communication channels. In any case, those skilled in the art will recognize that the invention is not limited by the particular manner in which rules are to be specified.

In operation, participants 120, 125, and 130 can be engaged in an ongoing chat session through each participants' respective chat client 105, 110, and 115. Participant 125 can decide at some point during the chat session to withdraw from the chat session by either disconnecting from the chat communication system or by changing an online status to one indicating that participant 125 is unavailable. Regardless, the chat client 110 can transmit a state change event 180 to the chat engine 155. The chat engine 155 then can consult the data store 160 to locate a user profile corresponding to participant 125.

The user profile can specify one or more alternate communication channels over which the chat engine 155 can contact participant 125, along with appropriate addresses for each respective alternate communication channel. As noted, the profile further can specify the conditions under which communications can be established with participant 125 via the alternate communication channel. Accordingly, after identifying one or more alternate communication channels, the chat engine 155 can establish a communication link 185 with communication device 135 of participant 125. For example, communication device 135 can be a pager over which participant 125 can receive further text messages. Alternatively, communication device 135 can be a wireless telephone over which text messages and/or audio messages can be received and sent.

As illustrated in FIG. 1, the participants, in particular participant 130, can utilize more than two communication devices. As such, the chat engine 155 can continue to establish communication links with the various communication devices 140-n in a serial fashion, as specified within the user profile of participant 130 responsive to further detected status change events. Thus, just as participant 125 can switch from using chat client 110 to communication device 135, so too can the participant 130 continue to participate seamlessly within an ongoing chat session despite continually moving from one communication device (communication channel) to another. Potential communication links between the various alternate communication devices of participant 130 are illustrated with broken lines. Notably, the participant 130 also can eventually migrate back to the chat client 115 from any one of the alternate communication devices.

The present invention maintains session continuity. Each chat participant can remain connected to the chat engine 155, and therefore, can remain connected to other chat participants without being directly connected to one another. Accordingly, any chat participant can switch to another communication channel and still maintain session connection and context with all other chat session participants through the chat engine 155.

Figure 2:
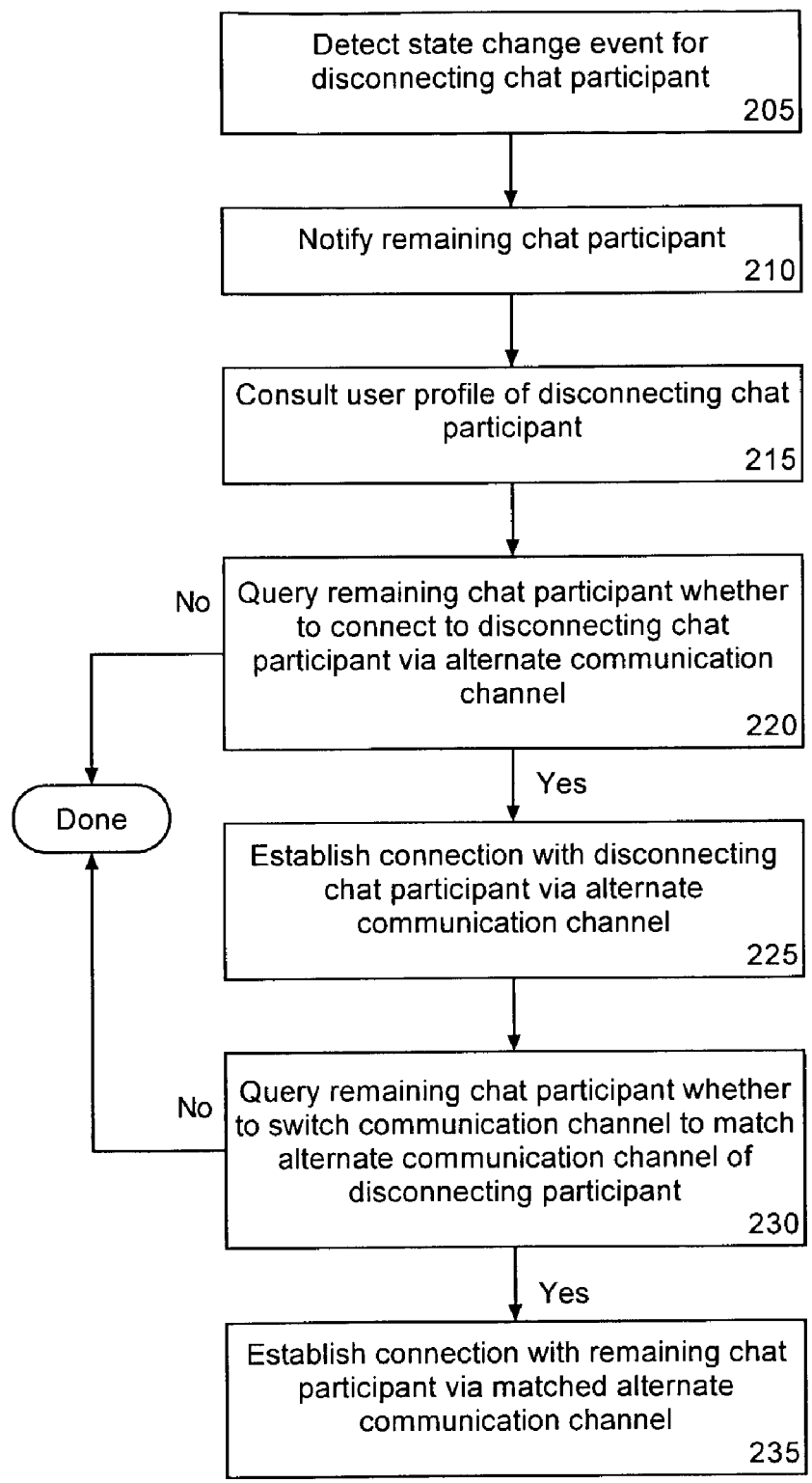
FIG. 2 is a flow chart illustrating a method of continuing an ongoing chat session with a participant via an alternate communication channel according to the inventive arrangements disclosed herein.

FIG. 2 is a flow chart illustrating a method 200 of continuing an ongoing chat session with a chat participant via an alternate communication channel according to the inventive arrangements disclosed herein. Although the present invention can be used in cases where two or more participants can be involved in a chat session, and each participant can switch between one or more alternate communication channels and back to a "beginning" communication channel, the method 200 will be described with reference to a chat session having two participants for purposes of clarity. Accordingly, one of the chat participants, referred to as a disconnecting chat participant, can discontinue participation in the chat session, whether by intentionally or unintentionally logging off from the chat communication system or by changing an online status.

Regardless, in step 205, a state change event indicating the manner in which the disconnecting chat participant was removed from the chat session can be received by the chat engine. The state change event can indicate the circumstances under which the disconnecting chat participant withdrew from the chat session, whether the disconnecting chat participant terminated participation in the chat session or changed an online status. If the disconnecting chat participant changed an online status, the state change event can indicate the disconnecting chat participant's new online status. Notably, the chat engine not only can receive a state change event, but also can detect that the disconnecting chat participant is no longer online by polling the chat clients or by a failed attempt to deliver a message, for example in the case of a communication network disruption or outage.

In step 210, the chat engine can send a notification to the remaining chat participant, or the non-disconnecting chat participant. In step 215, the chat engine can consult the user profile of the disconnecting chat participant. In step 220, the chat engine can query the remaining chat participant as to whether the chat participant would like to attempt communicating with the disconnecting chat participant over an alternate communication channel. The remaining chat participant can be notified of the type of alternate communication channel to be used.

If the user profile of the disconnecting chat participant specifies more than one alternate communication channel, the remaining chat participant can be queried as to which alternate communication channel is to be used. As noted the alternate communication channel selections presented to the remaining chat participant can vary according to the type of status change detected, the preferences of the disconnecting chat participant as specified within the user profile, and the identity of the remaining chat participant. For example, the particular alternate communication channel over which the chat engine attempts to connect with the disconnecting chat participant can be selected from a menu or prompt. The prompt can be displayed by the remaining chat participant's chat client or computing device. For instance, the chat engine can prompt the remaining chat participant as to whether a communication link should be established via paging and or cellular communications.

If the remaining chat participant chooses not to attempt contact with the disconnecting chat participant via an alternate communication channel, the method can end. Notably, if more than two chat participants were involved in the chat session, the remaining chat participants could continue the online chat without the disconnecting chat participant. If, however, the remaining chat participant chooses to attempt communication with the disconnecting chat participant over one of the alternate communication channels, the chat engine can establish a communication link with the disconnecting chat participant over the selected communication channel in step 225. The connection can be established with an address such as an electronic mail address, a telephone number, a user name, or the like which corresponds with the selected alternate communication channel.

In step 230, the chat engine optionally can query the remaining chat participant as to whether the participant prefers to switch his or her communication channel with the chat engine to one matching the disconnecting chat participant. For example, if a communication link was established with the disconnecting chat participant over a cellular telephone link using audio messages, the remaining chat participant also can choose to continue the chat session over a cellular telephone link using audio messages. Similar to the disconnecting chat participant, the remaining chat participant also can specify alternate communication channels and addresses within a user profile which can be accessed by the chat engine.

If the remaining participant prefers not to switch communication channels, the method can end. If, however, the remaining user does prefer to switch communication channels to match the communication channel over which the disconnecting party has been reconnected, in step 235, the chat engine can establish a communication link with the remaining participant over the matched alternate communication channel.

Those skilled in the art will recognize that one or more of the steps discussed with reference to FIG. 2 can be performed automatically without first querying the chat participants for approval or a recommended course of action. For example, according to an alternative embodiment of the present invention, the chat engine can automatically attempt to connect the remaining chat participant to the disconnecting user through an alternate communication channel as specified by the user profile of the disconnecting participant.

Figure 3:
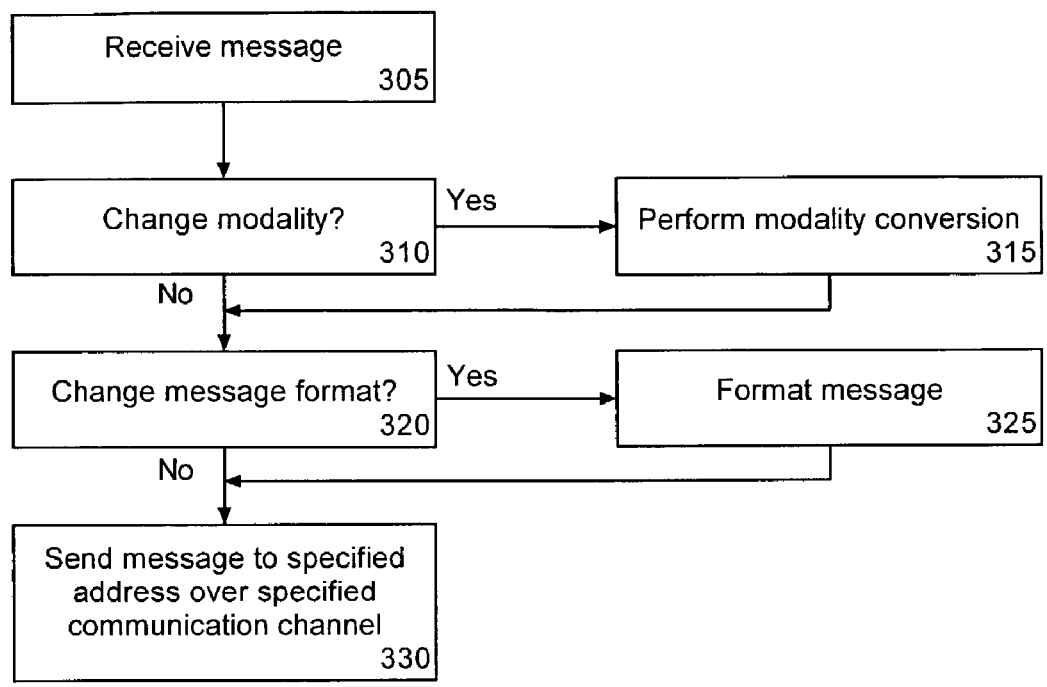
FIG. 3 is a flow chart illustrating a method of providing a message to a chat participant over an alternate communication channel in accordance with the inventive arrangements disclosed herein.

FIG. 3 is a flow chart illustrating a method 300 of providing a chat message to a chat participant over an alternate communication channel in accordance with the inventive arrangements disclosed herein. The method can begin in a state wherein the chat engine has previously established a communication link with a disconnecting participant over an alternate communication channel. Additionally, a remaining chat participant also may have established a communication link with the chat engine over an alternate communication channel. Accordingly, in step 305, a message directed to a chat participant and from another chat participant can be received by the chat engine. The received message can be from a disconnected chat participant and directed to a remaining chat participant, or can be received from a remaining chat participant and directed to a disconnected chat participant.

Regardless, in step 310, the chat engine can determine whether the received message must be transformed into another modality in order to send a representation of the received message to the target chat participant over the communication channel which presently links the target chat participant to the chat engine. To do so, the chat engine can identify the communication channel over which the message was received and the communication channel over which the message is to be sent. For example, if the received message is in text format and is to be forwarded to the target chat participant's wireless telephone as an audio message, the message must be text-to-speech converted. If the received message is an audio message and is to be forwarded to the target chat participant's chat client as text, the message must be speech recognized. Thus, if the message is to be converted to another modality, the method can proceed to step 315 where the chat message can be so converted. If no modality conversion is necessary, the method can continue to step 320. Such can be the case where a received text-based chat message is to be forwarded as a text message to a pager or wireless telephone, or a received audio message is to be forwarded to another communications device also as an audio message.

In step 320, a determination can be made as to whether the resulting message must be formatted for transmission over the alternate communication channel. In particular, the message can be formatted using an appropriate communications protocol prior to transmission. If the resulting message must be formatted, the method can proceed to step 325 where any necessary formatting of the message can be performed. For example, audio can be prepared for transmission using Voice-over-IP (VoIP), text can be prepared for transmission using Web paging or text messaging. In step 330, the resulting message can be sent over the alternate channel to the address associated with that alternate communication channel as specified within the user profile of the disconnected participant.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of chat messaging comprising:
   establishing a chat session through communication links with at least a first and a second participant for exchanging chat messages through a chat engine;
   detecting a state change for the first participant when the first participant withdraws from the chat session;
   notifying the second participant when the first participant withdraws from the chat session, and notifying each other participant remaining in the chat session when communication links have been established with additional participants other than the first and second participants;
   determining an alternate communication channel and an alternate communication channel address from a user profile of the first participant after the first participant withdraws from the chat session, the alternate communication channel being different from a communication channel linking the first participant to the chat session prior to the first participant withdrawing, wherein the user profile specifies a plurality of rules associated with a plurality of types of state changes, each rule uniquely corresponding to a particular type of state change and specifying which of a plurality of alternate communications channels is to be used depending on the particular type of the state change detected, wherein the user profile is configured to provide a user the option of assigning each rule to a private portion or a public portion of the user profile, such that each rule in the public portion can be overridden by a rule in a user profile of the second participant, and wherein the user further has the option to specify which of the plurality of alternate channels is to be used depending on an identity of the second participant;
   while maintaining the communication link with the second participant, establishing a different communication link with the first participant using the alternate communication channel and the alternate communication channel address, such that the first participant and the second participant are communicatively linked through the chat engine; and
   when communication links have previously been established with the additional participants other than the first and second participants, continuing the chat session with the additional participants and the second participant by maintaining communications links between the additional participants and the second participant when the first participant withdraws from the chat session.

2. The method of claim 1, further comprising:
   receiving a message from the first participant through the alternate communication channel.

3. The method of claim 2, further comprising:
   formatting the message using a communications protocol and sending the message to the second participant.

4. The method of claim 3, said formatting step further comprising:
   translating the message from a modality conforming to the alternate communication channel of the first participant to a modality that conforms to a communication channel used by the second participant.

5. The method of claim 1, further comprising:
   redirecting a received message from the second participant to the first participant using the alternate communication channel.

6. The method of claim 5, said redirecting step further comprising:
   translating the received message from a modality conforming to a communication channel used by the second participant to a modality conforming to the alternate communication channel of the first participant.

7. The method of claim 5, said redirecting step further comprising:
   formatting the message using a communications protocol associated with the alternate communication channel; and
   sending the message to the alternate communication channel address for the first participant over the alternate communication channel.

8. The method of claim 1, further comprising:
   while maintaining the communication link with the second participant, establishing another different communication link with the first participant using a second alternate communication channel and a second alternate communication channel address, such that the first participant and the second participant are communicatively linked through the chat engine, and wherein the second alternate communication channel and the second alternate communication address are determined from the user profile of the first participant.

9. The method of claim 1, wherein the state change event is a disconnect event or a status change event.

10. The method of claim 1, further comprising:
    terminating the communication link with the first participant.

11. The method of claim 1, wherein said step of establishing a different communication link occurs automatically without first prompting the second participant.

12. The method of claim 1, said notifying step further comprising:
    prompting the second participant whether to establish the different communication link with the first participant using the alternate communication channel and the alternate communication channel address.

13. The method of claim 1, further comprising:
    establishing an alternate communication link with the second participant using a second alternate communication channel and a second alternate communication channel address, wherein a type of the second alternate communication channel is the same as a type of the alternate communication channel of the first participant.

14. The method of claim 13, further comprising:
first querying the second participant whether to switch to a communication channel matching a type of the alternate communication channel of the first participant.

15. A machine-readable storage, having stored thereon a computer program having a plurality of code sections executable by a machine for causing the machine to perform the steps of:
establishing a chat session through communication links with at least a first and a second participant for exchanging chat messages through a chat engine;
detecting a state change for the first participant when the first participant withdraws from the chat session;
notifying the second participant when the first participant withdraws from the chat session, and notifying each other participant remaining in the chat session when communication links have been established with additional participants other than the first and second participants;
determining an alternate communication channel and an alternate communication channel address from a user profile of the first participant after the first participant withdraws from the chat session, the alternate communication channel being different from a communication channel linking the first participant to the chat session prior to the first participant withdrawing, wherein the user profile specifies a plurality of rules associated with a plurality of types of state changes, each rule uniquely corresponding to a particular type of state change and specifying which of a plurality of alternate communications channels is to be used depending on the particular type of the state change detected, wherein the user profile is configured to provide a user the option of assigning each rule to a private portion or a public portion of the user profile, such that each rule in the public portion can be overridden by a rule in a user profile of the second participant, and wherein the user further has the option to specify which of the plurality of alternate channels is to be used depending on an identity of the second participant;
while maintaining the communication link with the second participant, establishing a different communication link with the first participant using the alternate communication channel and the alternate communication channel address, such that the first participant and the second participant are communicatively linked through the chat engine; and
when communication links have previously been established with the additional participants other than the first and second participants, continuing the chat session with the additional participants and the second participant by maintaining communications links between the additional participants and the second participant when the first participant withdraws from the chat session.

16. The machine-readable storage of claim 15, further comprising:
receiving a message from the first participant through the alternate communication channel.

17. The machine-readable storage of claim 16, further comprising:
formatting the message using a communications protocol and sending the format converted message to the second participant.

18. The machine-readable storage of claim 17, said formatting step further comprising:
translating the message from a modality conforming to the alternate communication channel of the first participant to a modality conforming to a communication channel used by the second participant.

19. The machine-readable storage of claim 15, further comprising:
redirecting a received message from the second participant to the first participant using the alternate communication channel.

20. The machine-readable storage of claim 19, said redirecting step further comprising:
translating the received message from a modality conforming to a communication channel used by the second participant to a modality conforming to the alternate communication channel of the first participant.

21. The machine-readable storage of claim 19, said redirecting step further comprising:
formatting the message using a communications protocol associated with the alternate communication channel; and
sending the message to the alternate communication channel address for the first participant over the alternate communication channel.

22. The machine-readable storage of claim 15, further comprising:
establishing an alternate communication link with the second participant using a second alternate communication channel and a second alternate communication channel address, wherein a type of the second alternate communication channel is the same as a type of the alternate communication channel of the first participant.

23. The machine-readable storage of claim 22, further comprising:
first querying the second participant whether to switch to a communication channel matching a type of the alternate communication channel of the first participant.

24. The machine-readable storage of claim 15, further comprising:
while maintaining the communication link with the second participant, establishing another different communication link with the first participant using a second alternate communication channel and a second alternate communication channel address, such that the first participant and the second participant are communicatively linked through the chat engine, and wherein the second alternate communication channel and the second alternate communication address are determined from the user profile of the first participant.

25. The machine-readable storage of claim 15, wherein the state change is a disconnect event or a status change event.

26. The machine-readable storage of claim 15, further comprising:
terminating the communication link with the first participant.

27. The machine-readable storage of claim 15, wherein said step of establishing a different communication link occurs automatically without first prompting the second participant.

28. The machine-readable storage of claim 15, said notifying step further comprising:
    prompting the second participant whether to establish the different communication link with the first participant using the alternate communication channel and the alternate communication channel address.

29. A chat communication system comprising:
    a plurality of user profiles specifying alternate communication channels for chat participants engaged in a chat session;
    a chat engine configured to
        detect a state change when one of the chat participants withdraws from the chat session,
        notifying each other chat participant remaining in the chat session when one of the chat participants withdraws from the chat session,
        maintaining the chat session when more than one chat participant remains after one chat participant withdraws such that remaining chat participants can view the full history of the chat session and continue the chat session as if the one chat participant had not withdrawn from the chat session, and
        after one of the chat participants has withdrawn, establishing, based upon a user profile of the chat participant that has withdrawn, an alternative communication link among the chat participants using a corresponding specified alternate communication channel, wherein the user profile specifies a plurality of rules associated with a plurality of types of state changes, each rule uniquely corresponding to a particular type of state change and specifying which of a plurality of alternate communications channels is to be used depending on the particular type of the state change detected, wherein the user profile is configured to provide a user the option of assigning each rule to a private portion or a public portion of the user profile, such that each rule in the public portion can be overridden by a rule in a user profile of the second participant, and wherein the user further has the option to specify which of the plurality of alternate channels is to be used depending on an identity of the second participant; and
    a message modality converter configured to convert messages from a modality conforming to one communication channel to a modality conforming to the corresponding specified alternative communication channel.

30. The chat communication system of claim 29, said message modality converter comprising:
    a speech recognition engine configured to convert user spoken utterances to text.

31. The chat communication system of claim 29, said message modality converter comprising:
    a text-to-speech engine configured to convert text to audio representations of the text.

32. The chat communication system of claim 29, wherein said chat engine is configured to convert messages using one of a plurality of communication protocols conforming to a selected communication channel.

\* \* \* \* \*